United States Patent
Kulprathipanja et al.

(10) Patent No.: US 11,931,728 B2
(45) Date of Patent: Mar. 19, 2024

(54) PROCESS AND APPARATUS FOR DISTRIBUTING FUEL AND AIR TO A CATALYST REGENERATOR

(71) Applicant: UOP LLC, Des Plaines, IL (US)

(72) Inventors: Sathit Kulprathipanja, Schaumburg, IL (US); Michael A. Stine, Lake Zurich, IL (US); Michael S. Sandacz, Glen Ellyn, IL (US)

(73) Assignee: UOP LLC

( * ) Notice: Subject to any disclaimer, the term of this patent is extended or adjusted under 35 U.S.C. 154(b) by 454 days.

(21) Appl. No.: 17/200,286

(22) Filed: Mar. 12, 2021

(65) Prior Publication Data

US 2022/0288571 A1     Sep. 15, 2022

(51) Int. Cl.
| | | |
|---|---|---|
| *B01J 23/90* | (2006.01) | |
| *B01J 4/00* | (2006.01) | |
| *B01J 38/14* | (2006.01) | |
| *B01J 38/18* | (2006.01) | |
| *B01J 38/30* | (2006.01) | |

(52) U.S. Cl.
CPC .............. *B01J 23/90* (2013.01); *B01J 4/002* (2013.01); *B01J 38/14* (2013.01); *B01J 38/18* (2013.01); *B01J 38/30* (2013.01)

(58) Field of Classification Search
CPC .................................. B01J 23/90; B01J 4/002
See application file for complete search history.

(56) References Cited

U.S. PATENT DOCUMENTS

| | | | |
|---|---|---|---|
| 6,558,531 | B2 | 5/2003 | Steffens |
| 8,753,502 | B1 | 6/2014 | Sexton |
| 9,266,103 | B1 | 2/2016 | Davydov |
| 9,597,652 | B1 | 3/2017 | Pretz |
| 9,889,418 | B2 | 2/2018 | Pretz |
| 10,227,271 | B2 | 3/2019 | Pretz |

FOREIGN PATENT DOCUMENTS

KR    2061284 B1 * 12/2019 ............. B01J 38/02

OTHER PUBLICATIONS

Machine translation of KR 10-2061284 B1. (Year: 2019).*

* cited by examiner

*Primary Examiner* — Catherine S Branch
(74) *Attorney, Agent, or Firm* — Paschall & Associates, LLC; James C. Paschall

(57) ABSTRACT

An oxygen gas stream is distributed to a spent catalyst stream through an oxygen nozzle of an oxygen gas distributor and a fuel gas stream is distributed to the spent catalyst stream through a fuel nozzle of a fuel gas distributor. An oxygen gas jet generated from said oxygen nozzle and a fuel gas jet generated from said fuel gas nozzle have the same elevation in the regenerator. In a regenerator, an oxygen gas distributor and a fuel gas distributor may be located in a mixing chamber. A fuel outlet of a fuel nozzle of the fuel gas distributor may be within a fifth of the height of the mixing chamber from an oxygen outlet of an oxygen nozzle of the oxygen gas distributor. In addition, clear space is provided between a fuel gas nozzle on a fuel gas distributor and a closest oxygen nozzle on an oxygen gas distributor.

20 Claims, 4 Drawing Sheets

US 11,931,728 B2

PROCESS AND APPARATUS FOR DISTRIBUTING FUEL AND AIR TO A CATALYST REGENERATOR

FIELD

The field is the regeneration of catalyst and particularly the combustion of coke from fluidized catalyst.

BACKGROUND

Light olefin production is vital to the production of sufficient plastics to meet worldwide demand. Paraffin dehydrogenation (PDH) is a process in which light paraffins such as ethane and propane can be dehydrogenated to make ethylene and propylene, respectively. Dehydrogenation is an endothermic reaction which requires external heat to drive the reaction to completion. Fluid catalytic cracking (FCC) is another endothermic process which produces substantial ethylene and propylene.

In PDH and FCC reactions with fluidized catalyst, coke can deposit on the catalyst while catalyzing the reaction. The catalyst may be regenerated in a catalyst regenerator by combusting coke from the catalyst in the presence of oxygen. The hot regenerated catalyst may then be transferred back to the reactor to catalyze the reaction. However, the coke produced in the PDH reaction can provide insufficient heat from combustion in the regenerator to promote the endothermic dehydrogenation process. Insufficient heat from regenerated catalyst delivered to the reactor has been observed recently in FCC due to advances in stripping efficiency resulting in less hydrocarbons on spent catalyst transported to the catalyst regenerator. Hence, supplemental fuel such as fuel gas may be fed to the catalyst regenerator to heat the catalyst sufficiently to transfer sufficient enthalpy to drive the endothermic reaction. Conversely, if insufficient heat is provided to drive the endothermic reaction, olefin production can suffer.

Dehydrogenation catalyst may incorporate a dehydrogenation metal with a molecular sieve or an amorphous material. The catalyst must be sufficiently robust and appropriately sized to be able to resist the attrition expected in a fluidized system. FCC catalyst is typically a Y zeolite with an optional MFI zeolite to boost propylene production.

The regeneration process and equipment must be designed to minimize damage to the catalyst and to the regeneration equipment. This can be particularly challenging when fuel gas is added to the regenerator which can promote hot spots in areas where fuel gas combusts with insufficient means to disperse the heat. A high degree of vapor and catalyst mixing ensures complete combustion of the supplemental fuel gas and good heat transfer between vapor and catalyst. The catalyst is a large heat sink, so the supplemental fuel gas should be burned while in intimate contact with sufficient catalyst to avoid excessively high temperature. Excess catalyst temperatures can result in thermal damage to the surrounding catalyst and regeneration equipment because the heat is insufficiently dispersed.

Poor mixing between air and the supplemental fuel gas or insufficient contact time between fuel gas, air and catalyst may result in incomplete combustion of the coke on the catalyst or the fuel gas. Un-combusted fuel gas that persists downstream of primary catalyst separation equipment will tend to burn in the dilute catalyst phase resulting in excessively high temperature because most of the catalyst heat sink has already been separated from the gases in a phenomenon known as afterburn. If for some reason the unburned fuel gas exits the regenerator without completely combusting, the vapor exiting the regenerator has the possibility of burning in downstream equipment which is not rated for the high temperatures common in a regenerator or result in unburned fuel gas being released to the atmosphere. Conditions in the regenerator should be selected to minimize flame development which can damage catalyst and equipment due to its intense heat.

There is a need, therefore, for improved methods of contacting catalyst with fuel gas and air and mixing fuel and air in a catalyst regeneration process.

BRIEF SUMMARY

Oxygen gas, such as air, and fuel gas are mixed in a catalyst regenerator by distributing both to the same location in the catalyst regenerator. An oxygen gas stream is distributed to a spent catalyst stream through an oxygen nozzle of an oxygen gas distributor and a fuel gas stream is distributed to the spent catalyst stream through a fuel nozzle of a fuel gas distributor. An oxygen gas jet generated from said oxygen nozzle and a fuel gas jet generated from said fuel gas nozzle have the same elevation in the regenerator. In a regenerator, an oxygen gas distributor and a fuel gas distributor may be located in a mixing chamber. A fuel outlet of a fuel nozzle of the fuel gas distributor may be within a fifth of the height of the mixing chamber from an oxygen outlet of an oxygen nozzle of the oxygen gas distributor. In an additional embodiment, the fuel gas distributor may be below the oxygen gas distributor. In a further embodiment, clear space is provided between a fuel gas nozzle on a fuel gas distributor and a closest oxygen nozzle on an oxygen gas distributor.

These arrangements ensure that the oxygen gas and the fuel gas thoroughly mix in the regenerator to provide manageable combustion to heat and regenerate spent catalyst in the regenerator.

DEFINITIONS

Figure 1:
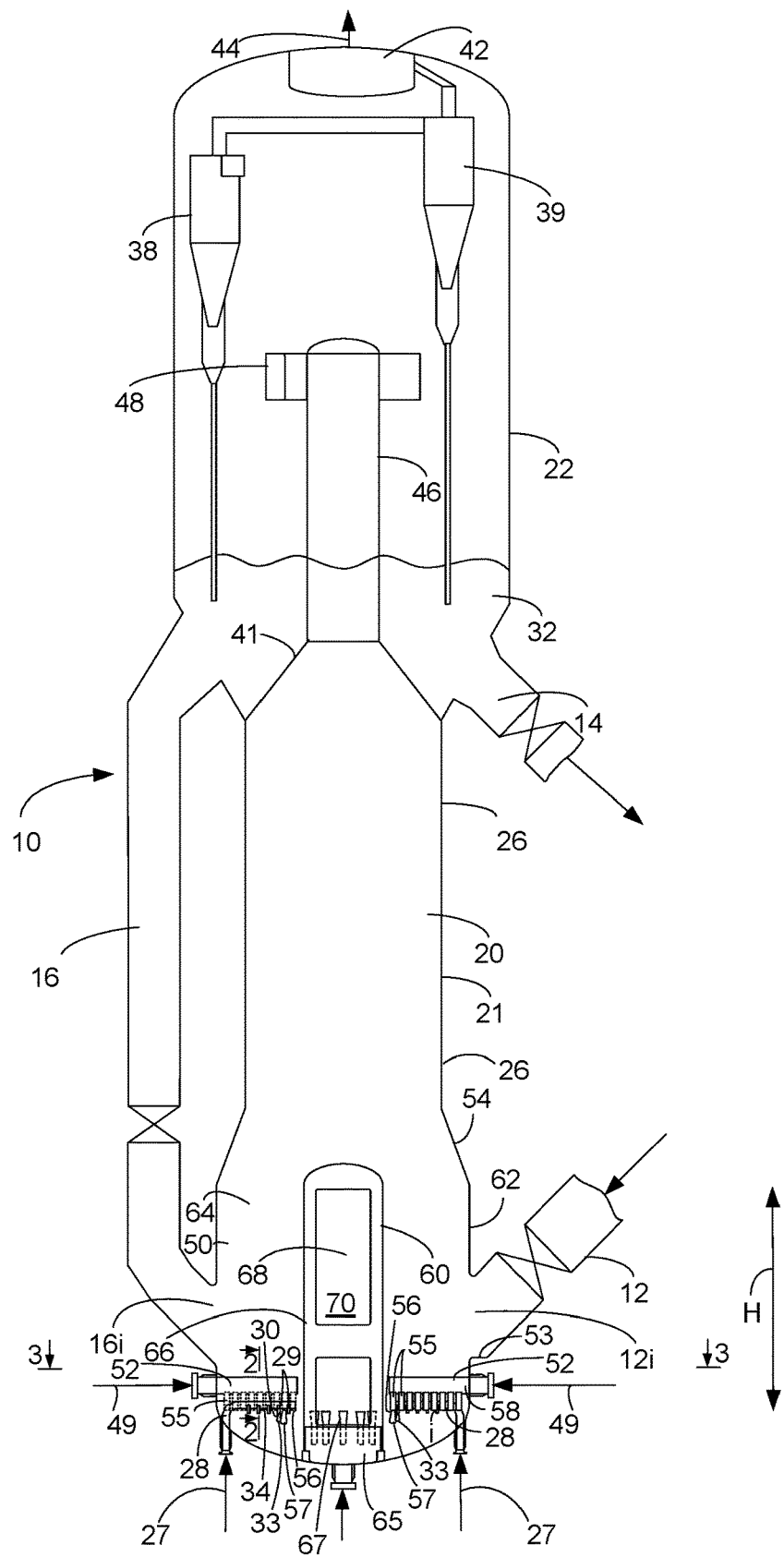
FIG. 1 is a schematic elevational drawing of a process and apparatus of the present disclosure.

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "fuel gas" comprises hydrocarbons, hydrogen and mixtures thereof.

As used herein, the term "predominant" or "predominate" means greater than 50%, suitably greater than 75% and preferably greater than 90%.

DETAILED DESCRIPTION

The disclosure provides a process and apparatus that promotes thorough contacting between gas and catalyst with supplemental fuel combustion to decarbonize and heat the catalyst to temperatures sufficient to drive the endothermic reactions in the reactor. The combustion in the regenerator is necessary to balance heat generation between the regenerator and the reactor.

The supplemental fuel gas is thoroughly mixed with oxygen gas, such as air, to provide consistent combustion without generation of hot spots in the regenerator that can damage equipment and catalyst exposed to the high temperature incursions.

The teachings herein may be applicable to any process that requires catalyst to be regenerated for an endothermic reaction. Paraffin dehydrogenation (PDH) and fluid catalytic cracking (FCC) are examples of such processes. FCC catalyst is used to crack larger hydrocarbon molecules to smaller hydrocarbon molecules at around atmospheric pressure and about 427° C. (800° F.) to 538° C. (1000° F.) and a catalyst to oil ratio of about 5 to about 30. PDH catalyst is used in a dehydrogenation reaction process to catalyze the dehydrogenation of ethane and/or propane to ethylene and propylene. The PDH process will be described exemplarily to illustrate the disclosed apparatus and process.

The conditions in the dehydrogenation reaction may include a temperature of about 500 to about 800° C., a pressure of about 40 to about 310 kPa and a catalyst to oil ratio of about 5 to about 100. The dehydrogenation reaction may be conducted in a fluidized manner such that gas, which may be the reactant paraffins or a fluidizing inert gas, is distributed to the reactor in a way that lifts the dehydrogenation catalyst in the reactor vessel while catalyzing the dehydrogenation of propane and/or ethane. During the catalytic dehydrogenation reaction, coke is deposited on the dehydrogenation catalyst to reduce the activity of the catalyst. The dehydrogenation catalyst must then be regenerated.

A spent catalyst standpipe 12 transports spent catalyst from the dehydrogenation reactor (not shown) to the catalyst regenerator 10 through a control valve. Heated regenerated catalyst from the regenerator 10 is transported back to the dehydrogenation reactor in a return regenerated catalyst standpipe 14 through a control valve with less concentration of carbon or coke on catalyst than in the spent catalyst standpipe 12 to catalyze the dehydrogenation reaction and to provide sufficient enthalpy to drive the endothermic dehydrogenation reaction.

The dehydrogenation catalyst may be of any of a variety of catalysts suitable for a fluidized dehydrogenation unit. The dehydrogenation catalyst selected should minimize cracking reactions and favor dehydrogenation reactions. Suitable catalysts for use herein include amorphous material or molecular sieves which may be dispersed in a porous inorganic carrier material such as silica, alumina, zirconia, or clay. An exemplary embodiment of a catalyst includes crystalline silica-alumina or silica-alumina-phosphate as the primary active component, a matrix, a binder, and a filler.

The primary active component ranges from about 10 to about 50 weight percent of the catalyst and may have a lattice structure that limits the size range of hydrocarbon molecules that can enter the lattice. The molecular sieves appropriate for the primary active component should have medium and smaller average pore size. Typically, molecular sieves with medium and smaller average pore size have pores with openings of no more than 0.7 nm in effective diameter defined by rings of ten or fewer.

The matrix component may include amorphous alumina or silica, and the binder and filler provide physical strength and integrity. Silica sol or alumina sol may be used as the binder and kaolin clay may be used as the filler. The catalyst particles may have a nominal diameter of about 20 to about 150 micrometers with the average diameter of about 70 to about 90 micrometers.

The dehydrogenation catalyst may support a dehydrogenation metal. The dehydrogenation metal may be a one or a combination of transition metals. A noble metal may be a preferred dehydrogenation metal; however, a IIB or IIIB metal may be a suitable dehydrogenation metal alone or in combination with other dehydrogenation metals. Iron, tungsten, gallium, copper, zinc or zirconium alone or in combination with each other or a noble metal may be suitable dehydrogenation metals. Combustion promoters may be utilized in addition to the catalyst. Metals may be incorporated into the lattice structure of the molecular sieve.

The acid function of the catalyst should be minimized to prevent cracking and favor dehydrogenation. Alkali metals and alkaline earth metals may also be included in the catalyst to attenuate the acidity of the catalyst. Rare earth metals may be included in the catalyst to control the activity of the catalyst. Concentrations of 0.05 to 10 wt % metals may be incorporated into the catalyst. In the case of the noble metals, it is preferred to use about 0.05 to about 2 wt % noble metal.

The spent catalyst is transported to the catalyst regenerator 10 to combust the coke and regenerate the spent catalyst into regenerated catalyst. The catalyst regenerator 10 includes a combustion chamber 20 and a catalyst separator 22 in which the regenerated catalyst is separated from flue gas generated in the combustion chamber 20. An oxygen gas distributor 52 provides oxygen gas from an oxygen gas line 49 to the combustion chamber 20 which lifts the spent catalyst in the combustion chamber 20 into the separation chamber 22. An oxygen nozzle 55 on the oxygen gas distributor 52 has an oxygen outlet 56 from which an oxygen jet 57 is generated. The oxygen jet 57 is a stream of oxygen gas such as air emitted from the oxygen outlet 56 of the oxygen nozzle 55 that is contiguous with the oxygen outlet. The oxygen nozzle 55 may be directed downwardly meaning that the oxygen outlet 56 is below the oxygen distributor 52 and/or is at the lower end of the oxygen nozzle 55.

In an embodiment, the oxygen gas distributor 52 includes a plurality of oxygen nozzles 55 each having an oxygen outlet 56 from which an oxygen jet 57 is generated. The oxygen nozzles 55 may extend from an oxygen gas header 58 which communicates oxygen gas from the oxygen gas line 49 to the oxygen nozzles. The oxygen nozzles 55 distribute oxygen gas through respective oxygen outlets 56 to produce the oxygen gas jets 57. The oxygen nozzles 55 may be directed downwardly meaning that the respective oxygen outlet 56 is below the oxygen distributor 52 and/or is at the lower end of the oxygen nozzle 55. The oxygen gas distributor 52 may be lined with a refractory.

The coke is burned off the spent catalyst by contact with the oxygen gas at regeneration conditions. In an exemplary embodiment, air is used as the oxygen gas, because air is readily available and provides sufficient oxygen for combustion, but other gases with a sufficient concentration of oxygen could also be used, such as purified oxygen. If air is used as the oxygen gas, about 10 to about 15 kg of air are required per kg of coke burned off the spent catalyst. Exemplary regeneration conditions include a temperature from about 500° C. (900° F.) to about 900° C. (1700° F.) and a pressure of about 150 kPa (gauge) (20 psig) to about 450 kPa (gauge) (70 psig) in the regenerator 10.

In some cases, coke on the spent catalyst may be insufficient to generate enough enthalpy from combustion to drive the endothermic reaction in the reactor. This can be the case with PDH units or FCC units with very efficient stripping sections. Hence, supplemental fuel gas is added to the regenerator to provide additional combustion enthalpy to drive the endothermic reaction in the reactor. The regenerator 10 may include a fuel gas distributor 28 for distributing fuel gas from fuel gas supply line 27 to the combustion chamber 20 for combustion in the combustion chamber. In an embodiment, the fuel gas distributor 28 may be located below the oxygen gas distributor 52, and the oxygen gas distributor 52 may be located above the fuel gas distributor 28. Hence, on the left-hand side of the mixing chamber 50 in FIG. 1, the oxygen nozzles 55 are shown in phantom to clearly reveal the fuel gas distributor 28. A fuel nozzle 29 on the fuel gas distributor 28 has an outlet 30 from which an fuel jet 33 is generated. The fuel jet 33 is a stream of fuel gas such as natural gas emitted from the fuel outlet 30 of the fuel nozzle 29 that is contiguous with the fuel nozzle 29. The fuel nozzle 29 may be directed downwardly meaning that the fuel outlet 30 is below the fuel distributor 28 and/or at the lower end of the fuel nozzle.

In an embodiment, the fuel gas distributor 28 includes a plurality of fuel nozzles 29 each having a fuel outlet 30 from which a fuel jet 33 is generated. The fuel nozzles 29 may extend from a fuel gas header 34 which communicates fuel gas from the fuel gas line 27 to the fuel nozzles. The fuel nozzles 29 distribute fuel gas through respective fuel outlets 30 to produce the fuel gas jets 33. The fuel nozzles 29 may be directed downwardly meaning that the respective fuel outlet 30 is below the fuel distributor 28 and/or at the lower end of the fuel nozzle. The fuel gas distributor 28 may be lined with a refractory.

In an embodiment, the fuel gas jet 33 and the oxygen gas jet 57 have the same elevation. In additional embodiment, the fuel gas jet 33 and the closest adjacent oxygen gas jet 57 have or share the same elevation. In other words, a portion of the fuel gas jet 33 and a portion of the oxygen gas jet have or share the same vertical location. The fuel gas jet 33 and the oxygen gas jet 57 may both be directed downwardly.

A fuel outlet 30 of the fuel nozzle 29 may be lower than an oxygen outlet 56 of the oxygen nozzle 55. An absence of equipment may be provided between the fuel gas distributor 28 and the oxygen gas distributor 52, so no equipment is interposed between the fuel gas distributor 28 and the closest oxygen gas distributor 52.

Catalyst, fuel gas and oxygen supply gas ascend in the combustion chamber 20 while coke is combusted from the catalyst and the fuel gas is also combusted to regenerate and heat the catalyst and generate flue gas. Fuel gas, flue gas and catalyst ascend in a fast-fluidized flow regime in which catalyst may slip relative to the gas and the gas can take indirect upward trajectories. The superficial velocity of the combustion gases in the combustion chamber is typically about 1.5 m/s (5 ft/s) to about 6 m/s (20 ft/s) and preferably about 2.1 m/s (7 ft/s) to about 5.4 m/s (18 ft/s), to provide a fast-fluidized flow regime.

In an exemplary embodiment, the regenerator 10 includes a mixing chamber 50. The mixing chamber may be located at a lower end of the regenerator 10. The mixing chamber 50 may include a spent catalyst pipe inlet 12i from the spent catalyst standpipe 12 which serves as an outlet for the spent catalyst standpipe. The mixing chamber 50 may also include a regenerated catalyst pipe inlet 16i from the regenerated catalyst standpipe 16 which serves as an outlet for the regenerated catalyst standpipe.

In an embodiment, the mixing chamber 50 has a mixing chamber height indicated by the double headed arrow H. The height H is equivalent to a tangent length which is essentially the height of the mixing chamber 50 from end to end, which end begins where the inner diameter of the chamber begins to decrease. In other words, the height H is the height of the vertical wall 62 of the mixing chamber 50. The mixing chamber 50 may be cylindrical in some embodiments.

The mixing chamber 50 is in downstream communication with the spent catalyst pipe inlet 12i and the regenerated catalyst pipe inlet 16i. The spent catalyst pipe inlet 12i discharges a stream of spent catalyst from a spent catalyst standpipe 12 into the mixing chamber 50, and the regenerated catalyst pipe inlet 16i discharges the recycled portion of regenerated catalyst from the regenerated catalyst standpipe 16 into the mixing chamber 50. The spent catalyst standpipe 12 may include a control valve thereon to control the rate of flow of the spent catalyst to the mixing chamber 50 from the reactor. The recycle regenerated catalyst standpipe 16 may also include a control valve thereon to control the rate of flow of the regenerated catalyst recycled to the mixing chamber 50. In some embodiments, the catalyst is fluidized in the spent catalyst standpipe 12 and/or the recycle regenerated catalyst standpipe 16 to facilitate catalyst flow. One or both of the spent catalyst inlet 12i and the regenerated catalyst inlet 16i may optionally be tangentially connected to the mixing chamber 50 to impart an angular motion to the catalyst entering the mixing chamber 50 to promote mixing. Additionally, a ramp 53 may be installed at the spent catalyst inlet 12i and/or the regenerated catalyst inlet 16i (not shown) to further promote mixing. The ramps may direct the flowing catalyst upward, downward, or to one side or the other in various embodiments. The oxygen gas distributor 52 emits oxygen gas into the mixing chamber 50 to fluidize the catalyst within the mixing chamber 50 and lift the catalyst from the mixing chamber upwardly into the combustion chamber 20. The oxygen gas discharged from the oxygen distributor 52 includes oxygen necessary for combustion.

The mixing chamber 50 receives a stream of spent catalyst and a stream of regenerated catalyst and mixes them together to provide a mixture of catalyst. While mixing, the hotter regenerated catalyst heats the cooler spent catalyst which serves to provide a catalyst mixture at a temperature of at least 600° C., suitably at least 650° C. and preferably at least 660° C. Coke on catalyst or fuel gas in contact with the catalyst mixture will be inclined to combust with oxygen immediately at these temperatures. The mixing chamber 50 may have an inner diameter that is larger than an inner diameter of the combustion chamber 20. The mixing chamber 50 may connect to the combustion chamber 20 through a mix transition 54 that may be frustoconical as shown in FIG. 1, but it may be helical or ellipsoidal. The superficial gas velocity in the mixing chamber 50 may about 0.9 m/s (3 ft/s), to about 5.4 m/s (18 ft/s), and the catalyst density may be from about 112 kg/m$^3$ (7 lb/ft$^3$) to about 400 kg/m$^3$ (25 lb/ft$^3$) constituting a dense catalyst phase in the mixing chamber 50. The fuel gas distributor 28 may be located in the mixing chamber 50 and distribute fuel gas to the mixing chamber. The oxygen gas distributor 52 may also be located in the mixing chamber 50 and distribute oxygen gas to the mixing chamber. In an embodiment, the fuel outlet 30 is vertically within a fifth, suitably a sixth, more suitably, a seventh, preferably an eighth, more preferably a ninth, and most preferably a tenth of the mixing chamber height H from the closest oxygen outlet 56.

A fast fluidized flow regime with a dilute catalyst phase will develop in the combustion chamber 20. The catalyst density in the dilute catalyst phase in the combustion chamber 20 will be from about 16 kg/m$^3$ (1 lb/ft$^3$) to about 192 kg/m$^3$ (12 lb/ft$^3$). The catalyst density in the mixing chamber 50 will be from about 48 kg/m$^3$ (3 lb/ft$^3$) to about 288 kg/m$^3$ (18 lb/ft$^3$).

The blend of gases and catalyst ascend from the combustion chamber 20 through a frustoconical transition section 41 into a riser 46 which has a smaller diameter than a diameter of the combustion chamber 20. A blend of gases and catalyst accelerate in the narrower riser 46 and are discharged from a riser termination device 48 into the separation chamber 22. The riser termination device 48 may utilize centripetal acceleration to separate regenerated catalyst from flue gas. The superficial gas velocity in the riser 46 will be about 6 m/s (20 ft/s) to about 15 m/s (50 ft/s) and constitute a dilute catalyst phase.

Regenerated catalyst separated from flue gas by the riser termination device 48 drops into a dense catalyst bed 32. The catalyst separation chamber 22 may include one or more regenerator cyclones 38 or other solid/gaseous separator devices to separate the regenerated catalyst still entrained in the flue gas. In an aspect, primary cyclones 38 may collect flue gas from the separation chamber 22 and transport the flue gas separated from catalyst to a secondary cyclone 39 to further separate regenerated catalyst from the flue gas before directing secondarily purified flue gas to the plenum 42. Flue gas is discharged from the regenerator 10 in a discharge line 44. Regenerated catalyst separated from flue gas in the cyclones 38, 39 is dispensed by dip legs into the dense catalyst bed 32. A return portion of the regenerated catalyst collected in the dense bed 32 of the catalyst separation chamber 22 may be transported in the return regenerated catalyst standpipe 14 back to the dehydrogenation reactor for catalyzing dehydrogenation reactions. A recycle portion of the regenerated catalyst collected in the dense bed 32 of the catalyst separation chamber 22 may be recycled in a recycle regenerated catalyst standpipe 16 back to the combustion chamber 20 of the regenerator 10 via the mixing chamber 50.

The rate of recycle of regenerated catalyst can be controlled by operation of the control valve on the recycle regenerated catalyst standpipe 16 independently of the rate of spent catalyst to the regenerator 10 by operation of the control valve on the spent catalyst pipe 12 to adjust the density of the catalyst. The density of the catalyst is directly proportional to the residence time of catalyst in the regenerator 10 and particularly the residence time of the catalyst in the mixing chamber 50. Consequently, by adjusting the density of the catalyst in the mixing chamber 50 through varying the recycle rate of regenerated catalyst through the control valve on the recycle regenerated catalyst standpipe 16, the residence time of catalyst in the regenerator 10 can be adjusted to ensure sufficient combustion and enthalpy absorbed by the catalyst and transferred to the dehydrogenation reactor.

The recycle rate of the regenerated catalyst through the recycle regenerated catalyst standpipe 16 to the mixing chamber 50 may be about 0.5 to about 10 times that of the rate of spent catalyst through the spent catalyst standpipe 12 to the mixing chamber. Suitably the recycle rate may be about 1 to about 5 times the rate of spent catalyst through the spent catalyst standpipe 12 to the mixing chamber 50.

A mixing baffle 60 may be positioned within the mixing chamber 50 in an embodiment, to facilitate mixing between the spent catalyst and the regenerated catalyst. The mixing baffle 60 may be a tube, and the vertical wall 62 of the mixing chamber 50 may define an annulus 64 between the mixing baffle and the vertical wall. The spent catalyst pipe inlet 12$i$ and the regenerated catalyst pipe inlet 16$i$ open into the annulus 64 in an embodiment. The regenerated catalyst pipe inlet 16$i$ may have a lower inlet into the mixing chamber 60 than the spent catalyst pipe inlet 12$i$. The mixing baffle 60 may be radially centered within the mixing chamber 50, and the mixing baffle 60 may be cylindrical in shape. The mixing baffle 60 may have a central longitudinal axis (not illustrated) aligned with a central longitudinal axis (not illustrated) of the mixing chamber 50. A lateral wall 66 of the mixing baffle 60 may be vertical in some embodiments. An oxygen gas baffle distributor 65 including a nozzle 67 may be positioned within the mixing baffle 60 in an embodiment. The oxygen gas baffle distributor 65 may include a plurality of nozzles 67.

In an exemplary embodiment, one or more baffle openings 68 are defined in the lateral wall 66 of the mixing baffle 60. The baffle opening 68 serves as an entrance into an interior 70 of the mixing baffle 60, and the baffle opening can also serve as an exit from the interior 70. In an exemplary embodiment, one or more of the baffle openings 68 have an elongated configuration such that an upper edge of the baffle opening 68 is spaced from the near a top of the mixing baffle 60 such as from 0.2 baffle diameters from the top. In an alternate embodiment, as illustrated in FIG. 1, one or more of the baffle openings 68 may include two or more openings, with one opening above the other such that the openings are radially aligned on the mixing baffle 60. The spent catalyst and the regenerated catalyst from the spent catalyst pipe inlet 12$i$ and the regenerated catalyst pipe inlet 16$i$, respectively, may enter the interior 70 through the baffle opening 68 and then exit the interior 70 through the baffle opening 68. This sequence facilitates mixing of the spent catalyst stream and the regenerated catalyst stream in the interior 70 of the mixing baffle 60 and in the annulus 64. The mixing of spent catalyst and regenerated catalyst in the mixing baffle 60 produces a thoroughly mixed catalyst of sufficient temperature to promote combustion of coke on catalyst and the fuel gas upon contact. The mixing of the spent catalyst and the regenerated catalyst ensures that combustion occurs in the presence of ample catalyst, so sufficient heat sink is available to absorb the heat, thus avoiding transferring excessive heat to surrounding equipment and catalyst potentially damaging it and maximizing the enthalpy transferred back to the endothermic reaction through the medium of the regenerated catalyst.

The interior 70 of the mixing baffle 60 is in fluid communication with the annulus 64 through the baffle opening 68. In an exemplary embodiment, the upper edge of an uppermost baffle opening 68 is above the lower edge of the spent catalyst pipe inlet 12$i$ and the lower edge of the regenerated catalyst pipe inlet 16$i$. The upper edge of the spent catalyst pipe inlet 12$i$ is the highest elevation of the intersection of the spent catalyst standpipe 12 with the mixing chamber 50, the lower edge is the lowest elevation of the intersection of the spent catalyst standpipe 12 with the mixing chamber 50, and the same relationship may apply to other inlets. In embodiments with the upper edge of the uppermost baffle opening 68 above the upper edge of the spent catalyst pipe inlet 12$i$ and the regenerated catalyst pipe inlet 16*i*, the catalyst from the spent catalyst pipe inlet 12*i* and the regenerated catalyst pipe inlet 16*i* can flow upwardly with the fluidizing gas from the oxygen gas distributor 52 through the baffle opening 68 and into the interior 70 of the mixing baffle 60.

Clear space with no intervening equipment is provided between a fuel outlet 30 of a fuel nozzle 29 and an oxygen outlet 56 of the closest oxygen nozzle. Additionally, the fuel outlet 30 is lower than the closest oxygen outlet 56. In an aspect, all of the fuel outlets 30 of the fuel gas distributor 28 may be lower than all of the oxygen outlets 56 of the oxygen gas distributor 52.

Figure 2:
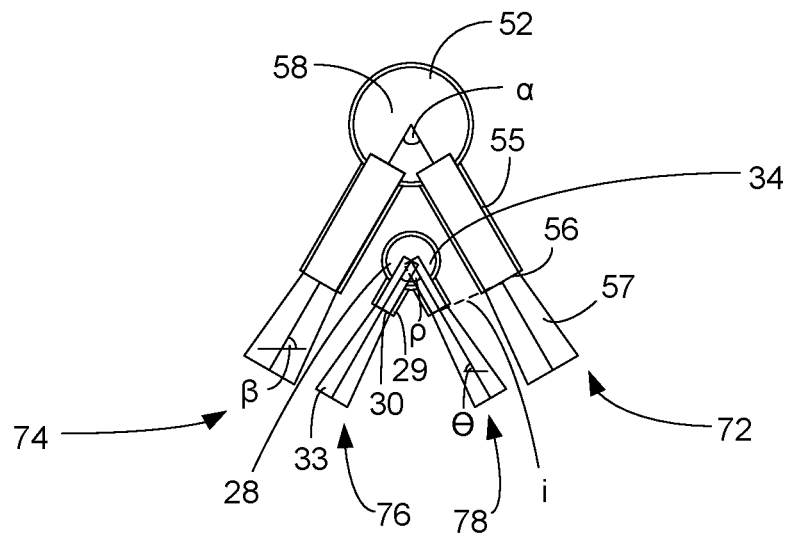
FIG. 2 is an elevational, sectional drawing taken at segment 2-2 of FIG. 1.

FIG. 2 illustrates a cross-sectional elevation view taken along segment 2-2 of FIG. 1. The oxygen gas header 58 of the oxygen gas distributor 52 is directly above the fuel gas header 34 of the fuel gas distributor 28. The oxygen nozzles 55 are arranged in two opposing rows 72, 74 on the oxygen gas distributor 52. The two opposing rows 72, 74 of oxygen nozzles 55 are connected to and depend from the oxygen gas header 58 and define an acute included angle α with each other taken from their centerlines. Additionally, the oxygen gas jet 57 from each oxygen nozzle 55 defines an acute angle β with horizontal. Moreover, oxygen gas jets 57 from each row 72, 74 of oxygen nozzles 55 define an acute included angle a with oxygen gas jets 57 in the opposing row 74, 72 of oxygen nozzles 55 taken from their centerlines.

Similarly, the fuel nozzles 29 are arranged in two opposing rows 76, 78 on the fuel gas distributor 28. Two opposing rows 76, 78 of fuel nozzles 29 are connected to and depend from the fuel gas header 34 and define an acute included angle ρ with each other. Additionally, the fuel gas jet 33 from each fuel nozzle 29 defines an acute angle θ with horizontal. Moreover, fuel gas jets 33 from each row 76, 78 of fuel nozzles 29 define an acute included angle p with fuel gas jets 33 in the opposing row 78, 76 of fuel nozzles taken from their centerlines.

Oxygen nozzles 55 have inlet ends that extend into the oxygen gas header 58. However, the lateral portion of the oxygen nozzles 55 extending from the oxygen gas header 58 is thicker than the inlet end extending into the oxygen gas header. Inlets in the inlet ends of the oxygen nozzles 55 have a smaller inner diameter than that of the oxygen outlets 56. This allows pressure drop to be exerted by the inlet ends which ensures more balanced flow and less stress on the oxygen outlets 56. Fuel nozzles 29 have inlet ends that extend into the fuel gas header 34. However, the lateral portion of the fuel nozzles 29 extending from the fuel gas header 34 is thicker than the inlet end extending into the fuel gas header 34. Inlets in the inlet ends of the fuel nozzles have a smaller inner diameter than that of fuel outlets 30. This allows pressure drop to be exerted by the inlet ends which ensures more balanced flow and less stress on the fuel outlets 30.

It can be seen in FIG. 2 that a lateral projection of the rows 72, 74 of oxygen nozzles 55 envelopes a lateral projection of the rows 76, 78 of fuel nozzles 29.

Clear space with no intervening equipment is provided between the fuel outlet 30 of the fuel nozzle 29 and the oxygen outlet 56 of the closest oxygen nozzle 55. For example, an imaginary line i between a center of a fuel outlet 30 of a fuel nozzle 29 and a center of a closest oxygen outlet 56 on an oxygen nozzle 55 is clear of equipment in that the imaginary line I intersects no other equipment besides perhaps the nozzles themselves between outlets.

Equipment may be absent between the fuel nozzle 29 and said oxygen nozzle 55. This arrangement ensures thorough contact between the fuel gas jets 33 and the oxygen gas jets 57 in the catalyst environment. During operation, catalyst will likely be in the space between the fuel outlet 30 and the oxygen outlet 56 that is clear of equipment.

Figure 3:
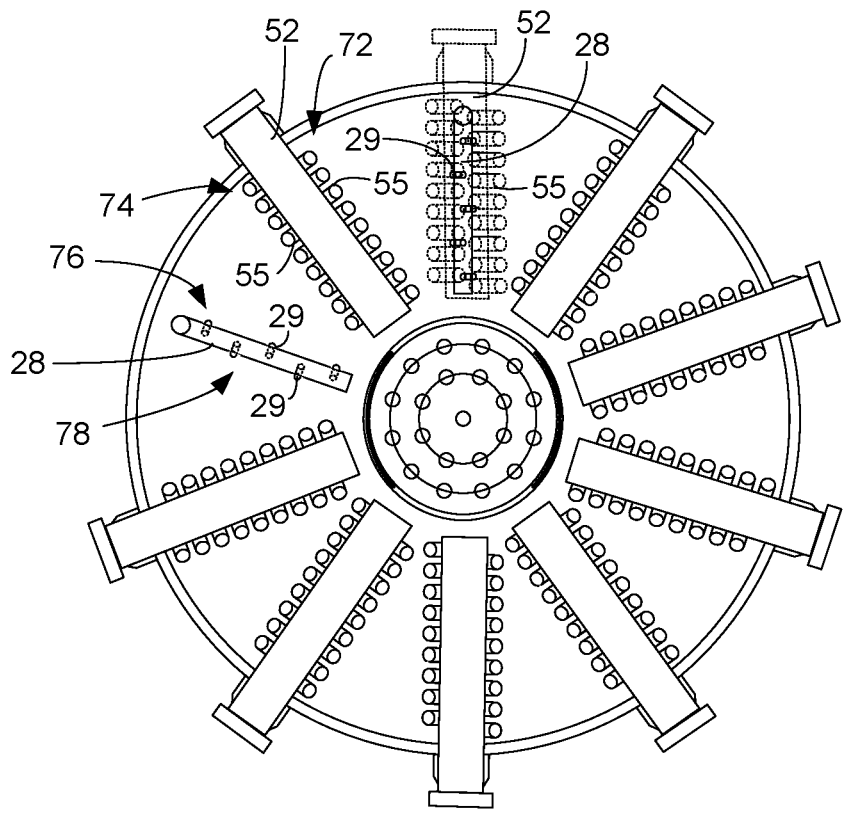
FIG. 3 is a plan, sectional drawing taken at segment 3-3 of FIG. 1.

FIG. 3 illustrates a cross-sectional plan view taken along segment 3-3 of FIG. 1. FIG. 3 clearly illustrates the oxygen gas distributors 52 which obscure view of the fuel gas distributors 28. Hence, an oxygen gas distributor 52 is removed at the 10 o'clock position, and an oxygen gas distributor is shown in phantom at the 12 o'clock position for purposes of illustration. The inlets of the oxygen nozzles 55 of the oxygen gas distributor 52 at the 12 o'clock position are shown in phantom while the fuel nozzles 29 of the fuel gas distributor 28 at the 12 o'clock position are shown in solid lines. The oxygen nozzles 55 in a first row 72 of oxygen gas distributors 52 are longitudinally offset from the oxygen nozzles in a second row 74. Additionally, fuel nozzles 29 in a first row 76 of fuel gas distributors 28 are longitudinally offset from fuel nozzles in a second row 78. Adjacent pairs of oxygen gas distributors 52 and fuel gas distributors 28 have their longitudinal centerlines arranged along the same radius in the mixing chamber 50 and are, thus, characterized as co-radial.

Figure 4:
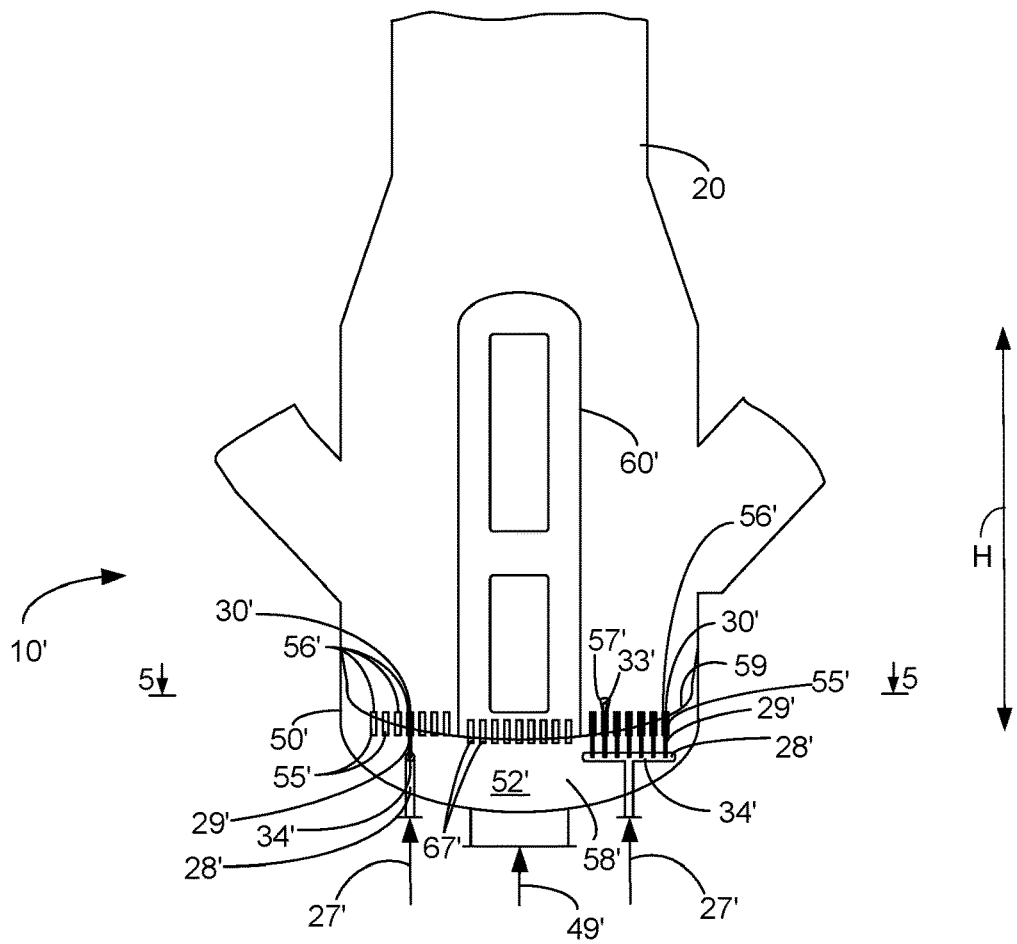
FIG. 4 is a partial schematic elevational drawing of an alternative embodiment to FIG. 1.
Figure 5:
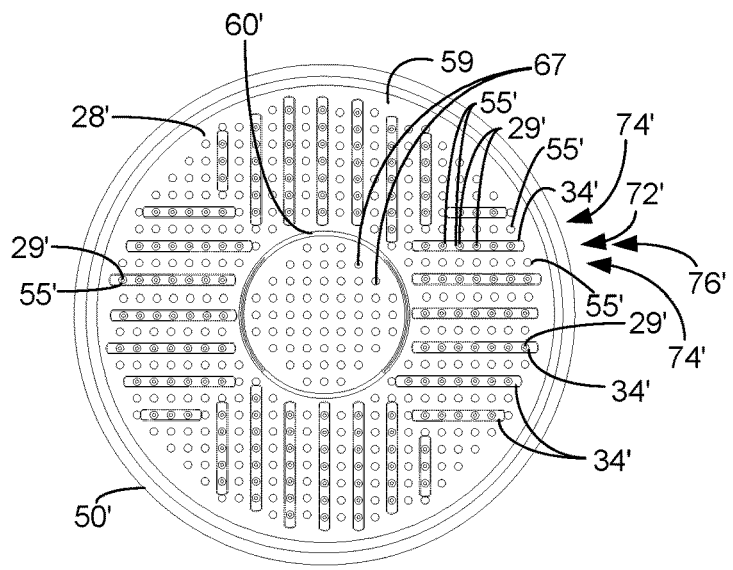
FIG. 5 is a plan, sectional drawing taken at segment 5-5 of FIG. 4.

FIGS. 4 and 5 illustrate an alternative embodiment to the embodiments of FIGS. 1-3 in which fuel gas jets and oxygen gas jets in the regenerator 10' have the same horizontal location. Many of the elements in FIGS. 4 and 5 have the same configuration as in FIGS. 1-3 and bear the same reference number. Elements in FIGS. 4 and 5 that correspond to elements in FIGS. 1-3 but have a different configuration bear the same reference numeral as in FIGS. 1-3 but are marked with a prime symbol (').

FIG. 4 illustrates a partial, schematic elevational view of the mixing chamber 50' which feeds the combustion chamber 20. An oxygen gas distributor 52' comprising an oxygen header 58' is fed with an oxygen gas from an oxygen gas line 49'. The oxygen header 58' is defined between a bottom of the regenerator 10' and an upper wall 59 which may be concaved to provide a dished upper surface. Oxygen nozzles 55' distribute oxygen gas through oxygen outlets 56' from the oxygen gas header 58' to the mixing chamber 50' and the regenerator 10'. An oxygen nozzle 67' or nozzles 67' may be positioned within the mixing baffle 60' to distribute air from the oxygen gas header 58' to the mixing baffle. The oxygen nozzle(s) 67' in the mixing baffle may be in communication with the oxygen gas distributor 52'.

A fuel gas distributor 28' fed by a fuel gas line 27' comprises a fuel gas header 34' that distributes fuel gas to the mixing chamber 50' and the regenerator 10' through fuel outlets 30' of fuel nozzles 29'. In an embodiment, the fuel outlet 30' is vertically within a fifth, suitably a sixth, more suitably, a seventh, preferably an eighth, more preferably a ninth, and most preferably a tenth of a mixing chamber height H from the oxygen outlet 56'. The fuel distributor 28' may comprise a plurality of fuel nozzles 29' with respective fuel outlets 30', and the oxygen distributor 52' may comprise a plurality of oxygen nozzles 55' with respective oxygen outlets 56'. In an embodiment, fuel outlets 30' are vertically within a fifth, suitably a sixth, more suitably, a seventh, preferably an eighth, more preferably a ninth, and most preferably a tenth of the height H of the mixing chamber to the closest adjacent oxygen outlet 56'.

The fuel nozzle 29' is disposed within an oxygen nozzle 55'. The fuel outlet 30' of the fuel nozzle 29' may be disposed within the oxygen outlet 56' of the oxygen nozzle 55'. Moreover, the fuel outlet 30' of the fuel nozzle 29' may be located at the same elevation as the oxygen outlet 56' of the oxygen nozzle 55'. In an embodiment, some or all of the fuel nozzles 29' may be located within respective ones of the oxygen nozzles 55', and/or have fuel outlets 30' at the same elevation as the oxygen outlets 56'.

An oxygen gas jet 57' from an oxygen nozzle 55' paired with a closest adjacent fuel gas jet 33' from the fuel nozzle 29' disposed within the oxygen nozzle 55' is illustrated in FIG.

4. The fuel gas jet 33' and the oxygen gas jet 57' have the same horizontal location and perhaps the same radial location in a plan view. A paired fuel gas jet 33' and the oxygen gas jet 57' may be concentric. Moreover, a paired fuel nozzle 29' and the oxygen nozzle 55' may be concentric.

The fuel gas jet 33' and said oxygen gas jet 55' are both directed upwardly. The oxygen outlet 56' may be above the inlet to the respective oxygen nozzle 55' and above the respective oxygen gas header 58'. The fuel outlet 30' may be above the inlet to the respective fuel nozzle 29' and above the respective the fuel gas header 34'. Clear space with no intervening equipment is provided between the fuel outlet 30' of the fuel nozzle 29' and the oxygen outlet 56' of the closest oxygen nozzle 55'.

FIG. 5 illustrates a cross-sectional plan view of the mixing chamber 50' taken along segment 5-5 of FIG. 4. FIG. 5 illustrates a pattern of fuel gas nozzles 29' disposed within oxygen gas nozzles 55'. Not all oxygen gas nozzles 55' have fuel gas nozzles 29' disposed within them. Oxygen gas nozzles 67 are located within the mixing baffle 60'. In an embodiment, no fuel gas nozzles 29' are located in the mixing baffle 60'. Fuel gas nozzles 29' extending from the fuel gas header 34', shown in phantom, define a row 76' of fuel gas nozzles 29' located with a first row 72' of oxygen nozzles 55'. The row 76' of fuel gas nozzles may be disposed between second rows 74' of oxygen nozzles 55'. In an aspect, the row 76' of fuel gas nozzles 29' may alternate with a second row 74' of oxygen nozzles 55' in which fuel gas nozzles are not located. Fuel nozzles 29' may be concentric with oxygen nozzles 55'.

Figure 6:
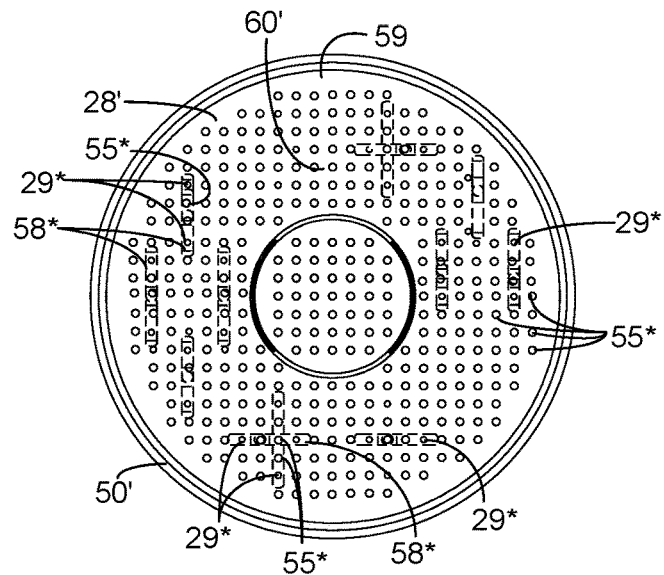
FIG. 6 is a plan, sectional drawing of an alternate embodiment taken at segment 5-5 of FIG. 4.

FIG. 6 illustrates an alternative embodiment to the embodiments of FIG. 5 in which fuel nozzles 29\* are surrounded by oxygen gas nozzles 55\* in the mixing chamber 50'. Many of the elements in FIG. 6 have the same configuration as in FIG. 5 and bear the same reference number. Elements in FIG. 6 that correspond to elements in FIG. 5 but have a different configuration bear the same reference numeral as in FIG. 5 but are marked with an asterisk symbol (*).

FIG. 6 also illustrates a cross-sectional plan view of the mixing chamber 50' taken along segment 5-5 of FIG. 4. FIG. 6 illustrates a pattern of fuel nozzles 29\* surrounded by oxygen nozzles 55\*. The fuel nozzles 29\* do not have to be disposed within oxygen nozzles 55\*. Fuel nozzles 29\* extend from respective fuel gas headers 58\* which are shown in phantom because the latter are hidden under the upper wall 59 of the oxygen gas distributor 28'. One or more fuel nozzles 29\* may extend from the fuel gas headers 58\*. Each fuel nozzle 29\* may supplant an oxygen nozzle 55\* in the pattern of oxygen nozzles. In an aspect, each fuel nozzle 29\* may be surrounded by oxygen nozzles 55\* in three, four, five or six directions. In FIG. 6, fuel nozzles 29\* are surrounded by oxygen nozzles in six directions.

Figure 7:
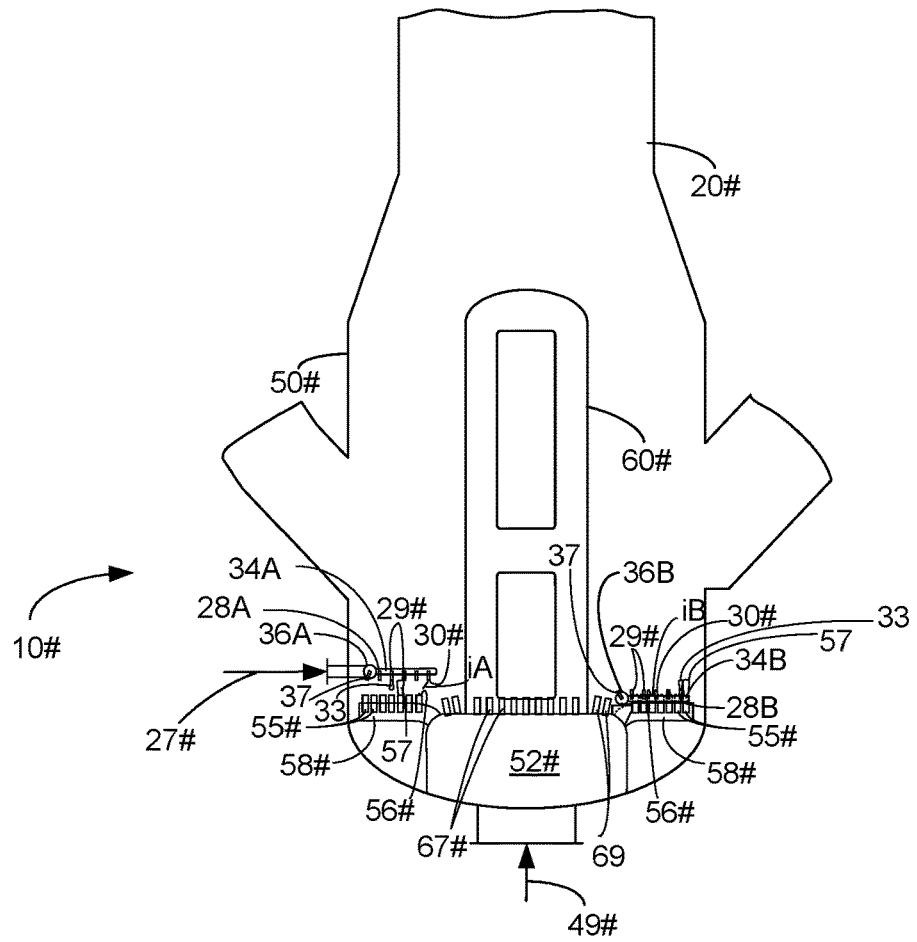
FIG. 7 is a partial schematic elevational drawing of an alternative embodiment to FIG. 1.

FIG. 7 illustrates an alternative embodiment to the embodiments of FIG. 1 in which an oxygen gas header 58# is fed from a common oxygen gas distributor 52# which also feeds oxygen gas to the mixing baffle 60#. Many of the elements in FIG. 7 have the same configuration as in FIG. 1 and bear the same reference number. Elements in FIG. 7 that correspond to elements in FIG. 1 but have a different configuration bear the same reference numeral as in FIG. 1 but are marked with a hashtag symbol (#).

The oxygen gas distributor 52# distributes oxygen gas from an oxygen gas supply line 49# to oxygen nozzles 55# on an oxygen gas header 58# and to oxygen nozzles 67# in the mixing baffle 60# and oxygen nozzles 69 between the mixing baffle and the oxygen gas headers.

The oxygen nozzles 55# are directed upwardly.

Two types of fuel gas distributors 28A and 28B are shown in FIG. 7. Either or both fuel gas distributors 28A and 28B may be used in the regenerator 10#. Fuel supply line 27# feeds a ring header 36A of a first fuel gas distributor 28A which distributes fuel gas to fuel gas headers 34A. The fuel gas header 34A may be disposed radially between adjacent oxygen gas headers 55#. Header fuel nozzles 29# may be located on the fuel gas headers 34#, ring fuel nozzles 37 may be located on the ring header 36A and both sets of nozzles may be directed downwardly. Clear space with no intervening equipment is provided between each header fuel nozzle 29# or ring fuel nozzle 37 and the closest oxygen nozzle 55#. An imaginary line iA between a center of a fuel outlet 30# of a fuel nozzle 29# and a center of a closest oxygen outlet 56# of an oxygen nozzle 55# is clear of equipment in that the imaginary line intersects no equipment other than the nozzles between the outlets.

The second fuel gas distributor 28B comprises a ring header 36B which distributes fuel gas to fuel gas headers 34B. The second fuel gas distributor 28B obscures portions of the adjacent oxygen gas header 55#, so obscured portions of the oxygen gas header 55# are shown in phantom. The fuel gas header 34B may be radially disposed between adjacent oxygen gas headers 55#.

Header fuel nozzles 29# may be located on the fuel gas headers 34B, ring fuel nozzles 37 may be located on the ring header 36A and both may be directed upwardly. Clear space with no intervening equipment is provided between each header fuel nozzle 29# or ring fuel nozzle 37 and the closest oxygen nozzle 55#. An imaginary line iB between a center of a fuel outlet 30# of a fuel nozzle 29# and a center of a closest oxygen outlet 56# of an oxygen nozzle 55# is clear of equipment in that the imaginary line intersects no equipment other than the nozzles between the outlets. Equipment is absent between the fuel nozzle 29# and the oxygen nozzle 55#. An oxygen gas jet 57 from an oxygen nozzle 55# and a fuel gas jet 33 from a fuel nozzle 29# are at the same elevation.

Specific Embodiments

While the following is described in conjunction with specific embodiments, it will be understood that this description is intended to illustrate and not limit the scope of the preceding description and the appended claims.

A first embodiment of the disclosure is a process for regenerating catalyst from a catalytic reaction comprising providing a spent catalyst stream; distributing an oxygen gas stream to the spent catalyst stream through an oxygen nozzle; generating an oxygen gas jet from the oxygen nozzle; distributing a fuel gas stream to the spent catalyst stream through a fuel nozzle; generating a fuel gas jet from the fuel nozzle, the fuel gas jet and the oxygen gas jet having the same elevation; and combusting the fuel gas stream and carbon on the spent catalyst with the oxygen gas stream to provide flue gas and regenerated catalyst. An embodiment of the disclosure is one, any or all of prior embodiments in this paragraph up through the first embodiment in this paragraph wherein the fuel gas jet and the oxygen gas jet have the same horizontal location. An embodiment of the disclosure is one, any or all of prior embodiments in this paragraph up through the first embodiment in this paragraph wherein the fuel gas jet and the oxygen gas jet are both directed downwardly. An embodiment of the disclosure is one, any or all of prior embodiments in this paragraph up through the first embodiment in this paragraph further comprising a clear space between the fuel gas jet and a closest oxygen gas jet. An embodiment of the disclosure is one, any or all of prior embodiments in this paragraph up through the first embodiment in this paragraph wherein the fuel gas jet and the oxygen gas jet are contiguous with each other. An embodiment of the disclosure is one, any or all of prior embodiments in this paragraph up through the first embodiment in this paragraph wherein the fuel gas jet and the oxygen gas jet are concentric. An embodiment of the disclosure is one, any or all of prior embodiments in this paragraph up through the first embodiment in this paragraph wherein the fuel gas jet is directed downwardly and the oxygen gas jet is directed upwardly. An embodiment of the disclosure is one, any or all of prior embodiments in this paragraph up through the first embodiment in this paragraph wherein the fuel gas jet and the oxygen gas jet are both directed upwardly. An embodiment of the disclosure is one, any or all of prior embodiments in this paragraph up through the first embodiment in this paragraph wherein a row of fuel gas jets alternates with a row of oxygen gas jets.

A second embodiment of the disclosure is a regenerator for combusting coke from spent catalyst comprising a mixing chamber for mixing catalyst and gas comprising an inlet for admitting a stream of spent catalyst to the regenerator, an oxygen gas distributor comprising an oxygen nozzle for distributing an oxygen gas to the regenerator; and a fuel gas distributor comprising a fuel nozzle for distributing a fuel gas to the regenerator, the fuel nozzle having a fuel outlet and the oxygen nozzle having an oxygen outlet, the fuel outlet being within a fifth of the mixing chamber height from the oxygen outlet; a catalyst outlet for discharging regenerated catalyst from the regenerator. An embodiment of the disclosure is one, any or all of prior embodiments in this paragraph up through the second embodiment in this paragraph wherein the oxygen gas distributor is above the fuel gas distributor. An embodiment of the disclosure is one, any or all of prior embodiments in this paragraph up through the second embodiment in this paragraph wherein the oxygen nozzle and the fuel nozzle are directed downwardly. An embodiment of the disclosure is one, any or all of prior embodiments in this paragraph up through the second embodiment in this paragraph further comprising a clear space between a fuel nozzle and a closest oxygen nozzle. An embodiment of the disclosure is one, any or all of prior embodiments in this paragraph up through the second embodiment in this paragraph further comprising a mixing baffle in the mixing chamber comprising openings in an outer wall thereof and an oxygen gas nozzle in the baffle. An embodiment of the disclosure is one, any or all of prior embodiments in this paragraph up through the second embodiment in this paragraph wherein equipment is absent between the fuel nozzle and the oxygen nozzle. An embodiment of the disclosure is one, any or all of prior embodiments in this paragraph up through the second embodiment in this paragraph wherein a fuel nozzle is disposed within an oxygen nozzle. An embodiment of the disclosure is one, any or all of prior embodiments in this paragraph up through the second embodiment in this paragraph wherein a fuel nozzle is surrounded by a plurality of oxygen gas nozzles. The regenerator of claim 10 wherein an outlet of the fuel nozzle is lower than an outlet of the oxygen nozzle.

A third embodiment of the disclosure is a regenerator for combusting coke from spent catalyst comprising an inlet for admitting a stream of spent catalyst to the regenerator, an oxygen gas distributor comprising an oxygen nozzle with an oxygen outlet for distributing an oxygen gas to the regenerator; a fuel gas distributor comprising a fuel nozzle with a fuel outlet for distributing a fuel gas to the regenerator, wherein clear space is provided between the fuel nozzle and the oxygen nozzle. An embodiment of the disclosure is one, any or all of prior embodiments in this paragraph up through the third embodiment in this paragraph wherein the fuel outlet is below the oxygen outlet.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for regenerating catalyst from a catalytic reaction comprising:
   providing a spent catalyst stream;
   distributing an oxygen gas stream to said spent catalyst stream through oxygen nozzles;
   generating an oxygen gas jet from said oxygen nozzle nozzles, wherein said oxygen nozzles are arranged at an acute angle with each other;
   distributing a fuel gas stream to said spent catalyst stream through a fuel nozzle; generating a fuel gas jet from said fuel nozzle, said fuel gas jet and said oxygen gas jet having the same elevation; and
   combusting said fuel gas stream and carbon on said spent catalyst with the oxygen gas stream to provide flue gas and regenerated catalyst.

2. The process of claim 1 wherein said fuel gas jet and said oxygen gas jet have the same horizontal location.

3. The process of claim 1 wherein said fuel gas jet and said oxygen gas jet are both directed downwardly.

4. The process of claim 3 further comprising a clear space between said fuel gas jet and a closest oxygen gas jet.

5. The process of claim 1 wherein said fuel gas jet and said oxygen gas jet are contiguous with each other.

6. The process of claim 2 wherein said fuel gas jet and said oxygen gas jet are concentric.

7. The process of claim 1 wherein said fuel gas jet is directed downwardly and the oxygen gas jet is directed upwardly.

8. The process of claim 1 wherein said fuel gas jet and said oxygen gas jet are both directed upwardly.

9. The process of claim 1 wherein a row of fuel gas jets alternates with a row of oxygen gas jets.

10. The process of claim 1 comprising a plurality of fuel nozzles and wherein said fuel nozzles are arranged at an acute angle with each other.

11. A process for regenerating catalyst from a catalytic reaction comprising:

providing a spent catalyst stream;

distributing an oxygen gas stream to said spent catalyst stream through oxygen nozzles;

generating an oxygen gas jet from said oxygen nozzles, wherein said oxygen nozzles are directed downwardly;

distributing a fuel gas stream to said spent catalyst stream through a fuel nozzle; generating a fuel gas jet from said fuel nozzle, said fuel gas jet and said oxygen gas jet having the same elevation; and combusting said fuel gas stream and carbon on said spent catalyst with the oxygen gas stream to provide flue gas and regenerated catalyst.

12. The process of claim 11 wherein said fuel gas jet and said oxygen gas jet have the same horizontal location.

13. The process of claim 11 wherein said fuel gas jet and said oxygen gas jet are both directed downwardly.

14. The process of claim 13 further comprising a clear space between said fuel gas jet and a closest oxygen gas jet.

15. The process of claim 11 wherein said fuel gas jet and said oxygen gas jet are contiguous with each other.

16. The process of claim 12 wherein said fuel gas jet and said oxygen gas jet are concentric.

17. The process of claim 11 wherein a row of fuel gas jets alternates with a row of oxygen gas jets.

18. A process for regenerating catalyst from a catalytic reaction comprising:

providing a spent catalyst stream;

distributing an oxygen gas stream to said spent catalyst stream through an oxygen outlet of an oxygen nozzle;

generating an oxygen gas jet from said oxygen nozzle;

distributing a fuel gas stream to said spent catalyst stream through a fuel outlet of a fuel nozzle;

generating a fuel gas jet from said fuel nozzle, said fuel gas jet and said oxygen gas jet having the same elevation; and combusting said fuel gas stream and carbon on said spent catalyst with the oxygen gas stream to provide flue gas and regenerated catalyst wherein said fuel outlet of said fuel nozzle is located below an oxygen outlet of said oxygen nozzle.

19. The process of claim 18 wherein a row of fuel gas jets alternates with a row of oxygen gas jets.

20. The process of claim 18 wherein said fuel gas jet and said oxygen gas jet have the same horizontal location.

\* \* \* \* \*

UNITED STATES PATENT AND TRADEMARK OFFICE
CERTIFICATE OF CORRECTION

PATENT NO. : 11,931,728 B2
APPLICATION NO. : 17/200286
DATED : March 19, 2024
INVENTOR(S) : Sathit Kulprathipanja et al.

Page 1 of 1

It is certified that error appears in the above-identified patent and that said Letters Patent is hereby corrected as shown below:

In the Claims

At Column 14, Lines 36-37, Claim 1 reads "oxygen nozzle nozzles", delete the term "nozzle".

Signed and Sealed this
Fourth Day of November, 2025

John A. Squires
*Director of the United States Patent and Trademark Office*